(12) United States Patent
Brunheroto et al.

(10) Patent No.: US 9,417,882 B2
(45) Date of Patent: Aug. 16, 2016

(54) LOAD SYNCHRONIZATION WITH STREAMING THREAD COHORTS

(71) Applicant: INTERNATIONAL BUSINESS MACHINES CORPORATION, Armonk, NY (US)

(72) Inventors: Jose R. Brunheroto, Mohegan Lake, NY (US); Chen-Yong Cher, Port Chester, NY (US); Hubertus Franke, Cortlandt Manor, NY (US); Jamin Naghmouchi, Rinteln (DE)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 14/138,724

(22) Filed: Dec. 23, 2013

(65) Prior Publication Data

US 2015/0178089 A1 Jun. 25, 2015

(51) Int. Cl.
*G06F 7/00* (2006.01)
*G06F 9/38* (2006.01)
*G06F 9/30* (2006.01)

(52) U.S. Cl.
CPC .......... *G06F 9/3851* (2013.01); *G06F 9/30043* (2013.01)

(58) Field of Classification Search
CPC ............................................... G06F 7/00
See application file for complete search history.

(56) References Cited

U.S. PATENT DOCUMENTS

| | | | |
|---|---|---|---|
| 7,469,266 B2 | 12/2008 | Gustavson et al. | |
| 7,720,891 B2 | 5/2010 | Luchangco et al. | |
| 8,732,713 B2* | 5/2014 | Coon | G06F 9/4881 718/102 |
| 2002/0116587 A1 | 8/2002 | Modelski et al. | |
| 2004/0187119 A1 | 9/2004 | Janik et al. | |
| 2007/0186028 A2 | 8/2007 | Kissell | |
| 2008/0301714 A1 | 12/2008 | Martinsen | |
| 2008/0313441 A1 | 12/2008 | Gustavson et al. | |
| 2010/0095271 A1 | 4/2010 | Archambault et al. | |
| 2011/0040941 A1 | 2/2011 | Diefendorff | |
| 2011/0055517 A1 | 3/2011 | Eichenberger et al. | |
| 2011/0219208 A1 | 9/2011 | Asaad et al. | |
| 2012/0137075 A1 | 5/2012 | Vorbach | |

OTHER PUBLICATIONS

International Search Report dated Mar. 18, 2015 for International Application No. PCT/US2014/70484.

* cited by examiner

*Primary Examiner* — Cheng-Yuan Tseng
(74) *Attorney, Agent, or Firm* — Tutunjian & Bitetto, P.C.; Jennifer R. Davis

(57) ABSTRACT

There is provided a processor implemented method for controlling a lock-stepped cohort. The method includes receiving instructions for each of a first lane and a second lane. The first lane is for the lock-stepped cohort and the second lane is for another cohort. The method further includes detecting a condition in which a first instruction at the first lane will have a higher latency than a second instruction at the second lane. The method also includes setting an indicator indicating where the first lane encountered the first instruction. The method additionally includes setting the first lane to inactive, while keeping the second lane active. The method further includes setting the first lane to active on a subsequent opportunity to execute said first instruction.

20 Claims, 6 Drawing Sheets

LOAD SYNCHRONIZATION WITH STREAMING THREAD COHORTS

BACKGROUND

1. Technical Field

The present invention relates generally to load synchronization and, in particular, to load synchronization with streaming thread cohorts.

2. Description of the Related Art

Consider multiple thread cohort members (i.e., threads in lockstep or Single Instruction Multiple Data (SIMD) slots) which are working in lockstep fashion (e.g., SIMD fashion) on independent data (e.g., independent network streams).

Particularly if threads in lockstep or SIMD slots work on independent data and have a separated control-flow, one of the threads will be confronted with the problem of more or less random stalls, because one of the thread cohort members (i.e., threads, or SIMD slots) faces a non-neglectable load latency that forces all of its siblings to wait until the necessary data is available. Good examples for such a problem are represented by finite state machines or a scanner which, based on the input, can go to states which foresee a variation or condition within the control-flow of different thread cohort members. This means that one thread cohort member can outpace another one.

FIG. 1 shows two Single Instruction Multiple Threads (SIMT) threads 101 and 102 without synchronization, in accordance with the prior art. The two threads load independent data from memory 110 into, e.g., a register at different points in time. While one thread 101 loads a new block 120, the thread's SIMT sibling 102 has to nullify the instruction and wait for the loading before new block 102 can process the data indicated by its current input pointer.

FIG. 2 shows four SIMT threads 201, 202, 203, and 204 without synchronization for a multi-buffer case, in accordance with the prior art. The multiple threads 201, 202, 203, and 204 load independent data from memory 210 into one of multiple buffers in, e.g., one or more of the registers at different points in time. While one thread 201 loads multiple new blocks (e.g., through direct-memory-access (DMA) or instructions) into its buffer, the thread's SIMT siblings 202, 203, and 204 have to nullify the instruction and wait.

SUMMARY

According to an aspect of the present principles, there is provided a processor implemented method for controlling a lock-stepped cohort. The method includes receiving instructions for each of a first lane and a second lane. The first lane is for the lock-stepped cohort and the second lane is for another cohort. The method further includes detecting a condition in which a first instruction at the first lane will have a higher latency than a second instruction at the second lane. The method also includes setting an indicator indicating where the first lane encountered the first instruction. The method additionally includes setting the first lane to inactive, while keeping the second lane active. The method further includes setting the first lane to active on a subsequent opportunity to execute said first instruction.

According to another aspect of the present principles, there is provided an apparatus for controlling a lock-stepped cohort. The apparatus includes a controller for receiving instructions for each of a first lane and a second lane, for detecting a condition in which a first instruction at the first lane will have a higher latency than a second instruction at the second lane, for setting an indicator indicating where the first lane encountered the first instruction, for setting the first lane to inactive, while keeping the second lane active, and for setting the first lane to active on a subsequent opportunity to execute said first instruction. The first lane is for the lock-stepped cohort and the second lane is for another cohort.

According to still another aspect of the present principles, there is provided a processor implemented method for improving performance through data pre-loading for first and second lock-stepped cohort members of which only the first member needs to loads data on demand and the second member pre-loads data in lock-step with the first member. The method includes setting a shared flag if any of the members need to issue a demand-load for a next buffer. The method further includes issuing the demand-load by both of the members, when the shared flag is set by both of the members. The method also includes examining whether a buffer and the data of the second member are ready for a pre-load, when the shared flag is set by only the first member. The method additionally includes reading the data by the second member in lock step with the first member, when the shared flag is set and the pre-load is deemed possible. The method further includes issuing no operation by the second member and issuing the demand-load by the first member, when the shared flag is set and the pre-load is deemed not possible. The method also includes resetting the shared flag, when the demand-load is completed. The method additionally includes setting a status bit to indicate the buffer for the second member has been pre-loaded, when the pre-load is complete.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
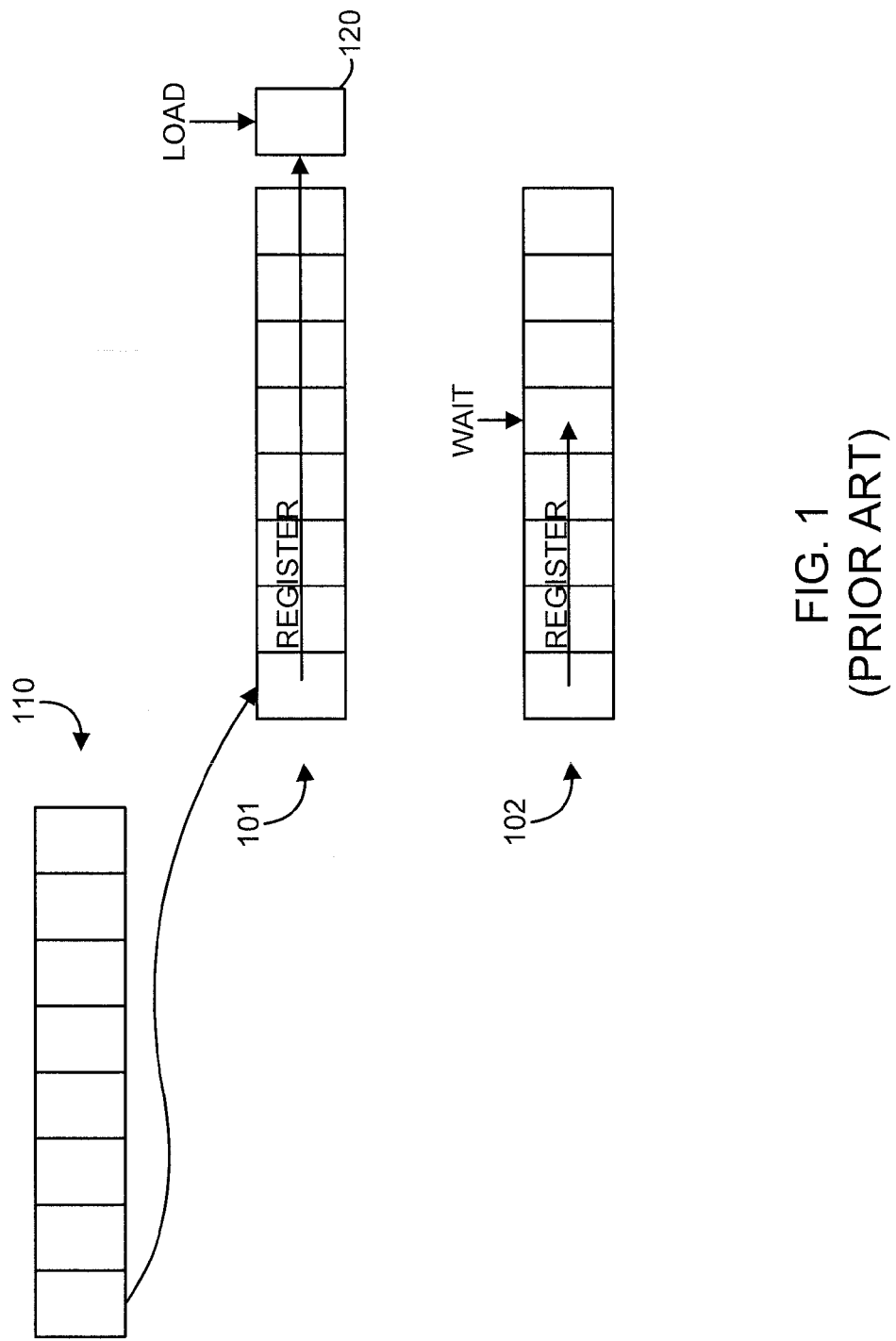
FIG. 1 shows two SIMT threads 101 and 102 without synchronization, in accordance with the prior art.
Figure 2:
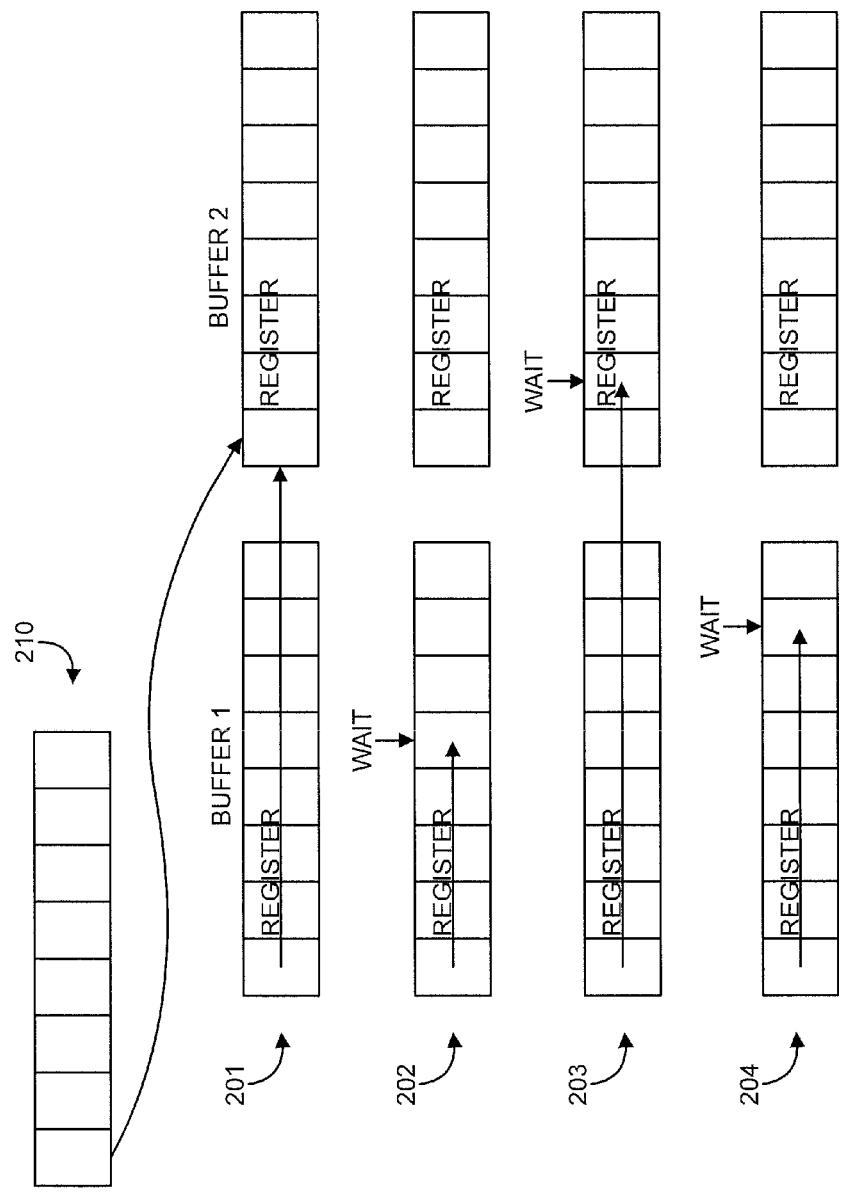
FIG. 2 shows four SIMT threads 201, 202, 203, and 204 without synchronization, in accordance with the prior art.

The present principles are directed to load synchronization with streaming thread cohorts. As used herein, the phrases "thread cohorts" and "thread cohort members" refer to multiple thread members (i.e., multiple threads in lockstep or Single Instruction Multiple Data (SIMD) slots) which are working in lockstep fashion (e.g., including, but not limited to, SIMD fashion) on independent data (e.g., including, but not limited to, independent network streams or documents).

In an embodiment, the present principles are directed to coordinating the fetching of data into local memory, and especially into registers by inserting prefetch instructions of the one or more memory streams into the instructions of these concurrent (in lockstep proceeding) threads or SIMD slots, where the memory locations being prefetched for each data stream are interleaved among these threads. The present principles advantageously hide load latencies to level-caches and/or main memory by space-efficiently loading/prefetching data into local memory. In an embodiment, the present principles use a latency window as described herein to issue future outstanding loads/prefetch-instructions for those thread cohort members that would have to stall.

Thus, an embodiment of the present principles is directed to multiple threads that are working in Single Instruction Multiple Data/Single Instruction Multiple Threads (SIMD/SIMT) fashion, that is, lockstep fashion, on independent data (e.g. independent network streams or documents). We propose a novel technique to coordinate fetching of data into local memory, and especially into the register, by inserting synchronized data move operations into the program flow which create a higher utilization through using stall time within warps (of those threads which do not necessarily have to issue loads by themselves), whereas the different threads which execute in lockstep communicate, e.g., over shared memory.

A description will now be given regarding an environment to which the present principles can be applied, in accordance with an embodiment of the present principles.

As an illustrative example, consider an application known as tokenizer that is commonly used in compiler and regular expression scanner Consider two or more tokenizer threads which run coherently, in lockstep fashion. The tokenizers are of the same kind The execution of the instructions thus happens in SIMD fashion. All the tokenizers execute the same instruction at the same time.

However, depending on the input data (for each tokenizer/thread an independent data stream), the finite state machine (FSM) chooses to advance/not advance/reset the current input pointer, which is parsing characters from the input stream. This means that based on the previous input each of the multiple tokenizers advances the current input pointer with a different speed over time. This means that all tokenizers execute the same instructions at the same time, and that they are also in the same iteration of the program, but they are reading new data with a different latency (depends on where in the cache hierarchy the data is located), because of the program flow.

In an embodiment, the present principles are applied to General Purpose computing on Graphics Processing Units (GPGPU). In an embodiment, the present principles are applied to Compute Unified Device Architecture (CUDA) GPGPUs. Of course, given the teachings of the present principles provided herein, one of ordinary skill in this and related arts will contemplate these and various other types of processors to which the present principles can be applied while maintaining the spirit of the present principles.

Figure 3:
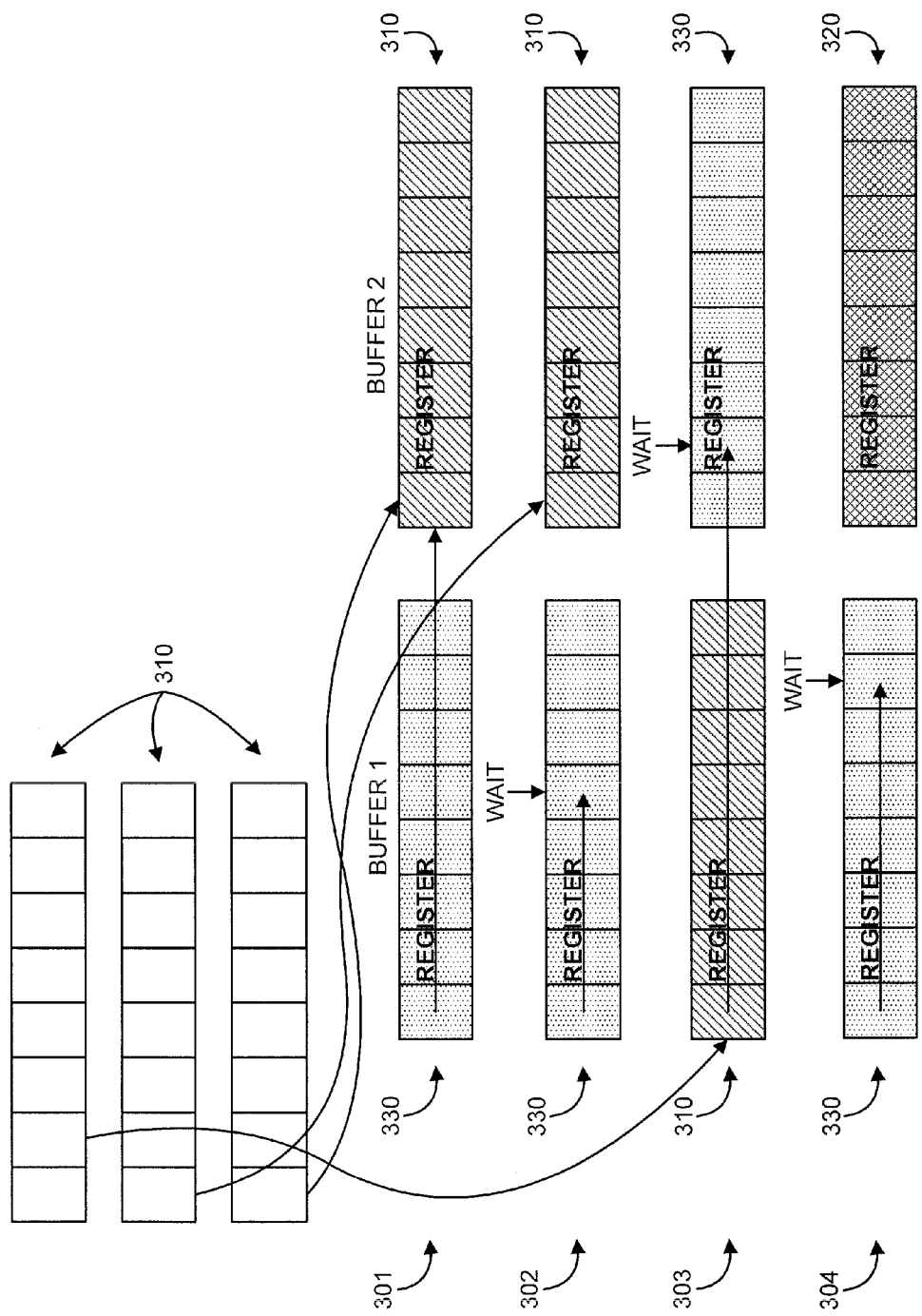
FIG. 3 shows four SIMT threads 301, 302, 303, and 304 with synchronization, to which the present principles can be applied.

A description will now be given regarding Single Instruction Multiple Threads (SIMT) with synchronization for a multi-buffer case with respect to FIG. 3. FIG. 3 shows four SIMT threads 301, 302, 303, and 304 with synchronization, to which the present principles can be applied. The multiple threads 301, 302, 303, and 304 load independent data into one of multiple buffers in, e.g., the register. If one thread loads, all the others load coherently, unless they would overwrite a block that is going to be used later.

The blocks 310 (also indicated using a diagonal line hatch pattern) can be updated (overwritten) with new data, because their content is not used anymore. The blocks 320 (also indicated using a cross hatch pattern) cannot be overwritten, since they already include new (yet) unused data which has been loaded before coherently on another threads load request. The blocks 330 (also indicated using a dotted hatch pattern) are still being processed and cannot be overwritten now. The buffers can reside in registers and/or in local memory.

Figure 4:
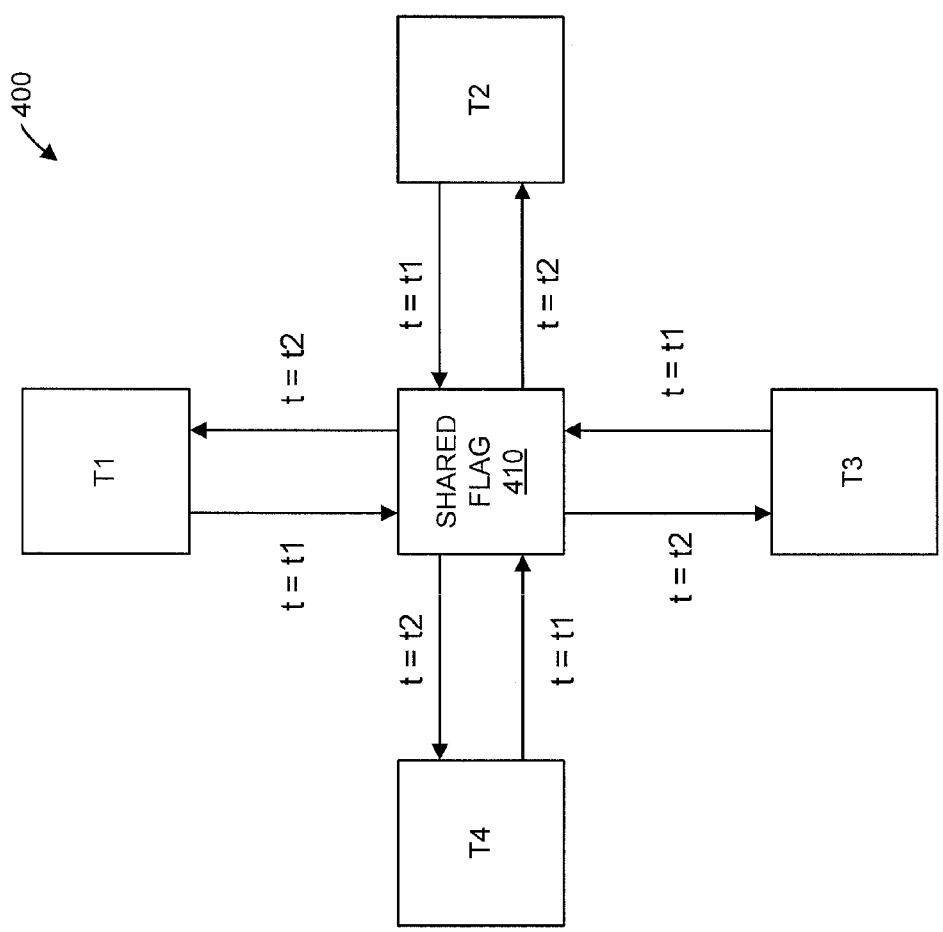
FIG. 4 shows inter-thread communication 400 between four threads, in accordance with an embodiment of the present principles.

A description will now be given regarding inter-thread communication, in accordance with an embodiment of the present principles. FIG. 4 shows inter-thread communication 400 between four threads, in accordance with an embodiment of the present principles. The four threads are threads T1, T2, T3, and T4.

All threads in a warp can communicate over a single flag 410 that is shared between them. If a thread needs to load, it will set the flag 410 (not atomic). At a later point in time, all threads T1, T2, T3, and T4 read the value of the described flag 410. If the flag 410 is set, each thread T1, T2, T3, and T4 on its own decides if a load can be issued based on the current buffer state. In the example of FIG. 4, t1<t2.

Figure 5:
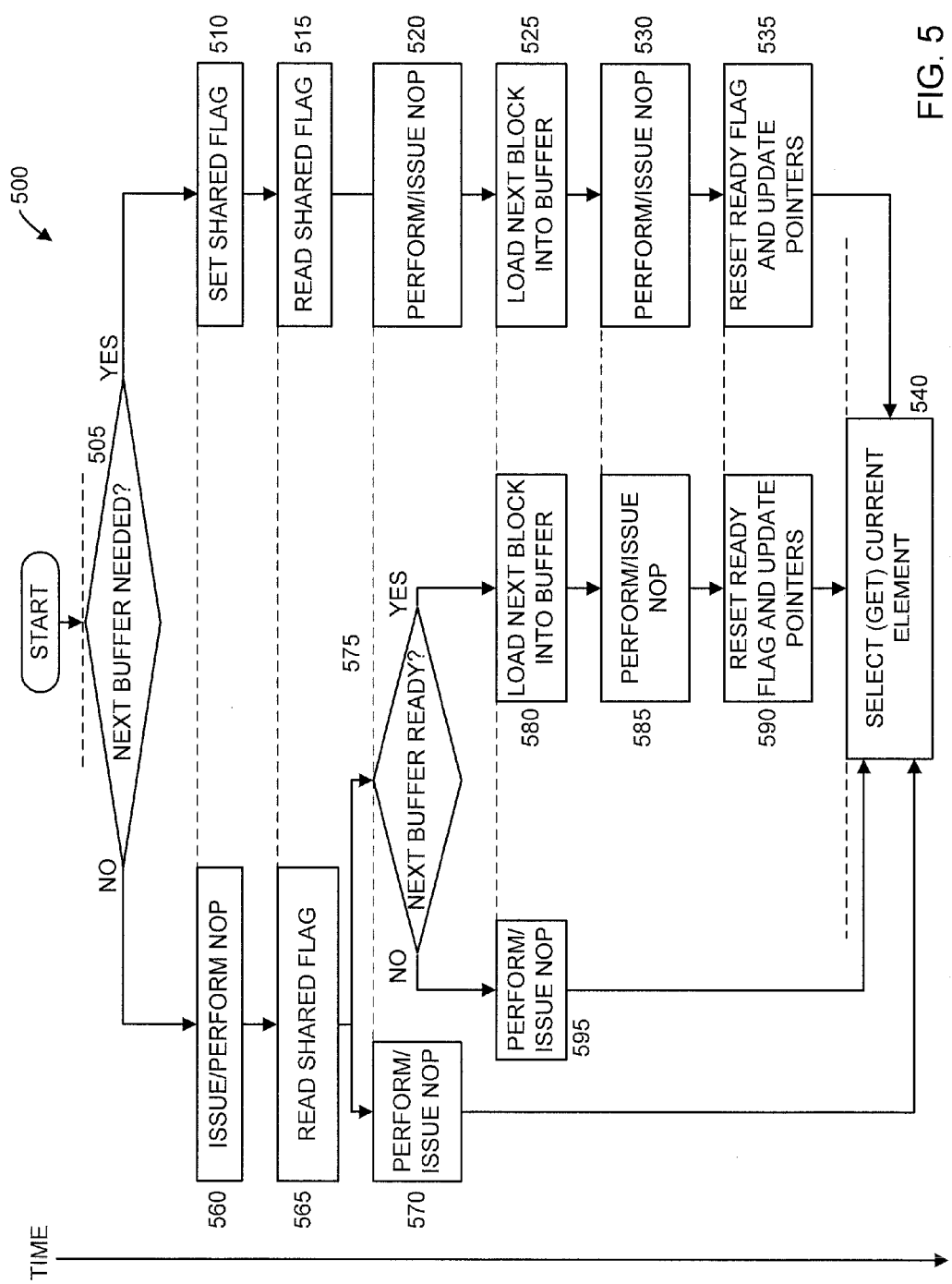
FIG. 5 shows a method 500 for load synchronization with stream thread cohorts, in accordance with an embodiment of the present principles.

FIG. 5 shows a method 500 for load synchronization with stream thread cohorts, in accordance with an embodiment of the present principles. It is to be appreciated that the steps in FIG. 5 have time implications. In particular, the steps are performed in order from top to bottom (as indicated by the arrow on the left delineated by the text "TIME"), where steps/blocks at a same vertical position are applied at the same time. Accordingly, vertically oriented dashed lines are used to show the start of steps and to readily indicate which steps are performed together since steps that begin at a same dashed line are performed at the same time. It is to be further appreciated that all threads implicated by method 500 are lockedstepped, and each thread follows the decision graph in FIG. 5 to choose which actions to enable based on their own conditions as described herein.

At step 505, check if the next buffer is needed (e.g., for a load). If so, then proceed to step 510. Otherwise, proceed to step 560.

At step 510, set the shared flag. At step 515, read the shared flag. At step 520, issue/perform no operation (nop). At step 525, load the next block into the buffer. At step 530, issue/perform nop. At step 535, reset the ready flag and update pointers corresponding thereto.

At step 540, select (get) the current element.

At step 560, issue/perform nop. At step 565, read the shared flag.

At step 570, issue/perform nop.

At step 575, check if the next buffer is ready. If so, then proceed to step 580. Otherwise, proceed to step 585.

At step 580, load the next block into the buffer. At step 585, issue/perform nop. At step 590, reset the ready flag and update pointers corresponding thereto.

At step 595 issue/perform nop.

Regarding method 500, it is to be appreciated that the ready flags indicate whether a buffer is ready (to be overwritten) and are set by the threads at the end of processing the buffer. The shared flag is set (e.g., step 510) to notify other cohorts that a notifying cohort needs to load data. The shared flag is reset (e.g., steps 590 and 535) when a corresponding load is complete. In an embodiment, the determination (e.g., step 575) of whether a buffer of a particular cohort is ready (e.g., for preloading) is made before the data for that particular cohort is needed. The pointers are updated to point to the next free entry in the buffer, to reflect the fact that space has been allocated for the load performed in step 580.

Figure 6:
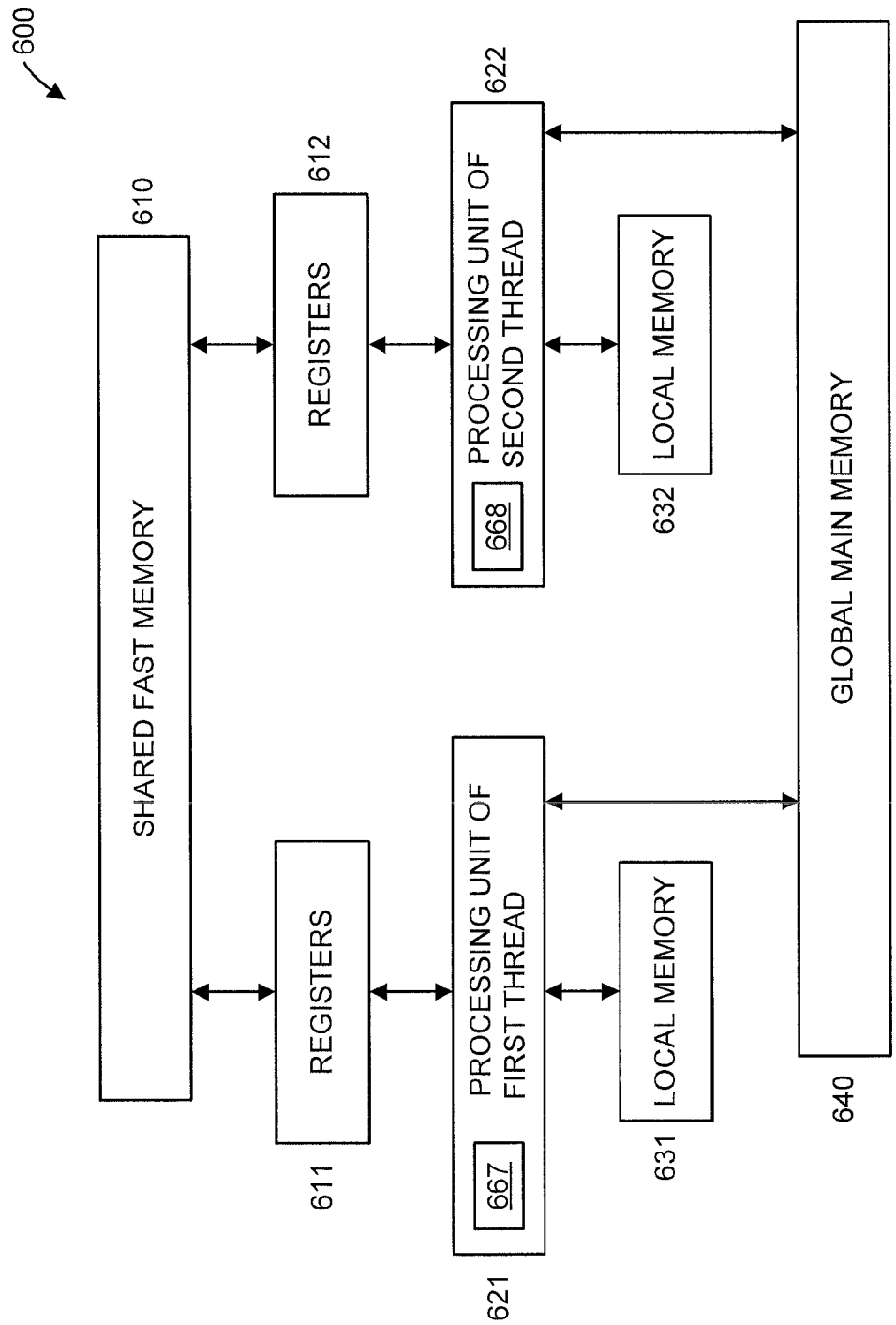
FIG. 6 shows a system 600 for load synchronization with streaming thread cohorts, in accordance with an embodiment of the present principles.

FIG. 6 shows a system 600 for load synchronization with streaming thread cohorts, in accordance with an embodiment of the present principles. The system 600 includes shared fast memory 610 (where the flags reside), registers 611, registers 612, processing unit 621 of a first thread, processing unit 622 of a second thread, a local memory 631, a local memory 632, and a global main memory 640. In an embodiment, registers 611, processing unit of a first thread 621, and local memory 631 relate to one cohort, and registers 612, processing unit of a second thread 622, and local memory 632 relate to another cohort. The buffers described with respect to method 500 can reside in, for example, the registers 611, 612 and/or the local memory 631, 632. In an embodiment, the shared fast memory 610 and the global main memory can be accessed with respect to any of the cohorts.

In the embodiment of FIG. 6, the processing unit of a first thread 621 includes a controller 667. In an embodiment, the controller 667 can perform the steps depicted in FIG. 5. However, it is to be appreciated that in other embodiments, a standalone controller can be used in place of controller 667. The standalone controller can be connected to the processing unit of a first thread 621 or another element in order to achieve the objectives of the present principles. In yet another embodiment, the processing unit of a first thread 621 can be used in place of controller 667. Accordingly, controller 667 is interchangeably referred to herein as a "processor" or "processing unit". In the embodiment of FIG. 6, the processing unit of a second thread 622 also includes a controller 668. The second thread can thus be processed similar to the first thread as described herein (so as to switch roles), depending upon the particular implementation. However, in other embodiments, a standalone controller can be used in place of controller 668. The standalone controller can be connected to the processing unit of a second thread 622 or another element in order to achieve the objectives of the present principles. In yet another embodiment, the processing unit of a second thread 622 can be used in place of controller 668. Accordingly, controller 668 is interchangeably referred to herein as a "processor" or "processing unit". Of course, in yet another embodiment, a single controller can be used in place of both controller 667 and 668 and can be standalone and connected to one or both of the processing units 621 and 622 (or other elements) or can be implemented within one of the processing units 621 and 622. These and other variations to the elements of FIG. 6 are readily contemplated by one of ordinary skill in the art given the teachings of the present principles provided herein, while maintaining the spirit of the present principles.

In an embodiment, the system 600 is implemented in a General Purpose computing on Graphics Processing Units (GPGPU). In an embodiment, the GPGPU can be a Compute Unified Device Architecture (CUDA) type GPGPU.

The present principles enable higher performance in lock-stepped thread cohort (e.g., SIMD) by allowing a long-latency cohort encountering a long latency load to nullify its load, so that other members can continue to execute. The preceding is described in further detail as follows.

The members of the thread cohort obtained their respective load address from their respective synchronization buffer or other location as initialized by a prelude code.

One of the members in the thread cohort (e.g., a SIMD slot) detects an impending long latency load (e.g., a cache miss), while other members are ready to execute the load and continue with the instruction. If all the members encounter an impending similar long latency load, then they all stall; this step is to ensure forward progress of the algorithm.

The member (that encounters the long latency load) records its load address on the synchronization buffer, and sets a flag (e.g., a special register or memory) to signal the nullifying of its load. Subsequent instructions dependent on the output of this load of the cohort can access the flag to know whether the load has been nullified.

All the other cohort members in the thread are notified and can execute their respective load if ready, and the cohort moves to the next instruction.

The flag is reset automatically if the cohort encounters the same load instruction again, or can be explicitly reset by an instruction if intended by the programmer.

The process continues until the buffer is empty, either in a looping manner or through repeated calls to the same code routine including the thread cohorts.

In an embodiment, the method is meant to converge the time spent on Single Instruction Multiple Data (SIMD) instructions $T_{SIMD} = \Sigma_{j=1,m}(\max_{i=1,n}\{T_{i,j}\})$ towards the time spent on Multiple Instruction Multiple Data (MIMD) instructions. $T_{SIMD} = \Sigma_{j=1,m}(\max_{i=1,n}\{T_{i,j}\})$. Whereas in SIMD in each iteration j the time-wise longest instruction i dominates the time that is spent, in MIMD the time-wise longest execution path (sum of all instructions a thread has to execute) dominates the total time spent. In our method, whenever a long SIMD instruction (e.g., a load) in one of the threads occurs, the other threads are advised to also execute this long instruction and e.g., preload data used in the future. Thus, we force the different threads to synchronize regarding execution time spent on their instructions and reduce the probability of mismatches in the time that different threads spend on execution of an instruction.

A description will now be given of an exemplary application to which the present principles can be applied, in accordance with an embodiment of the present principles. Consider a SIMD or Very Long Instruction Word (VLIW) architecture where one of the slots may experience longer load latencies than other slots. The present principles would detect the long latency, associate the latency with the load-consuming slot, and inhibit the slot to allow other slots to proceed without waiting for the long latency. The present principles use buffering technique to absorb the long latency of the slot. The buffer makes space for the fetched load data (after long latency) and will be processed in the next encountering of the instruction slot. It is to be appreciated that the preceding application is merely illustrative and, thus, the present principles can also be applied to other applications, as readily appreciated by one of ordinary skill in the art given the teachings of the present principles provided herein, while maintaining the spirit of the present principles.

A description will now be given regarding some of the differences between the present principles and the prior art. The majority of prior art is directed to stream prefetching techniques within the cache hierarchy, or fetching data blocks from lists such as matrices (a.k.a., list prefetching). In contrast, the present principles solve the problem of bringing data blocks into the local memory (e.g., register) respecting space efficiency, individual replacement policy, and latency utilization. The present principles can even be used in environments where no caches are existent. In contrast to the known prior art, the present principles solve the problem of stream data fetching without determining any load priorities. In contrast to the known prior art, the present principles are also capable of fetching data without issuing redundant prefetch instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A processor implemented method for controlling a lock-stepped cohort, the method comprising:
    receiving instructions for each of a first lane and a second lane, the first lane for the lock-stepped cohort and the second lane for another cohort;
    detecting a condition in which a first instruction at the first lane will have a higher latency than a second instruction at the second lane;
    setting an indicator indicating where the first lane encountered the first instruction;
    setting the first lane to inactive, while keeping the second lane active; and
    setting the first lane to active on a subsequent opportunity to execute said first instruction.

2. The method of claim 1, wherein the other cohort needs to load data on demand.

3. The method of claim 1, wherein the first lane and the second lane are any of threads and Single Instruction Multiple Data slots.

4. The method of claim 1, wherein said step of setting the first lane to inactive comprises setting a shared flag, the shared flag for indicating, when set, that the lock-stepped cohort needs to issue a load for a next buffer.

5. The method of claim 4, wherein said step of setting the first lane to active comprises resetting the shared flag when the load is completed, the shared flag for indicating, when reset, that the next buffer is available.

6. The method of claim 1, further comprising issuing a no operation or other operation by the other cohort in lock step with the lock-stepped cohort when the lock-stepped cohort issues a load.

7. A non-transitory article of manufacture tangibly embodying a computer readable program which when executed causes a computer to perform the steps of claim 1.

8. An apparatus for controlling a lock-stepped cohort, the apparatus comprising:
    a processor for receiving instructions for each of a first lane and a second lane, for detecting a condition in which a first instruction at the first lane will have a higher latency than a second instruction at the second lane, for setting an indicator indicating where the first lane encountered the first instruction, for setting the first lane to inactive, while keeping the second lane active, and for setting said first lane to active on a subsequent opportunity to execute said first instruction,
    wherein the first lane is for the lock-stepped cohort and the second lane is for another cohort.

9. The apparatus of claim 8, wherein the other cohort needs to load data on demand.

10. The apparatus of claim 8, wherein the first lane and the second lane are any of threads and Single Instruction Multiple Data slots.

11. The apparatus of claim 8, wherein the first lane is set to inactive by setting a shared flag, the shared flag for indicating, when set, that the lock-stepped cohort needs to issue a load for a next buffer.

12. The apparatus of claim 11, wherein the first lane is set to active by resetting the shared flag when the load is completed, the shared flag for indicating, when reset, that the next buffer is available.

13. A processor implemented method for improving performance through data pre-loading for first and second lock-stepped cohort members of which only the first member needs to loads data on demand and the second member pre-loads data in lock-step with the first member, the method comprising:
    setting a shared flag if any of the members need to issue a demand-load for a next buffer;
    issuing the demand-load by both of the members, when the shared flag is set by both of the members;
    examining whether a buffer and the data of the second member are ready for a pre-load, when the shared flag is set by only the first member;
    reading the data by the second member in lock step with the first member, when the shared flag is set and the pre-load is deemed possible;
    issuing no operation by the second member and issuing the demand-load by the first member, when the shared flag is set and the pre-load is deemed not possible;
    resetting the shared flag, when the demand-load is completed; and
    setting a status bit to indicate the buffer for the second member has been pre-loaded, when the pre-load is complete.

14. The method of claim 13, further comprising using the shared flag, by any of the members, to notify other ones of the members that a notifying one of the members needs to load data.

15. The method of claim 13, further comprising issuing a no operation or other operation by the second member in lock step with the first member, when the first member issues the demand-load.

16. The method of claim 13, further comprising determining if the buffer and the data of the second member are ready for pre-loading before the data of the second member is needed.

17. The method of claim 13, further comprising one of setting, reading, or resetting a status of the buffer of the second member to one of indicate or determine whether the buffer is available for a pre-load still being used, or pre-loaded, respectively.

18. The method of claim 13, further comprising allocating an available buffer for pre-loading if multiple buffers exist and are accessible by the second member.

19. The method of claim 13, further comprising setting a status, in a register or in a local memory, to indicate that the buffer of the second member is ready for pre-loading.

20. A non-transitory article of manufacture tangibly embodying a computer readable program which when executed causes a computer to perform the steps of claim 13.

* * * * *